United States Patent
Sekine et al.

(10) Patent No.: US 10,696,397 B2
(45) Date of Patent: Jun. 30, 2020

(54) UNMANNED AERIAL VEHICLE AND MEDICAL SUPPORT METHOD

(71) Applicant: Terumo Kabushiki Kaisha, Tokyo (JP)

(72) Inventors: Yuusuke Sekine, Kanagawa (JP); Shinya Sano, Kanagawa (JP); Chisato Iwakiri, Kanagawa (JP); Ryouta Yamane, Tokyo (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 165 days.

(21) Appl. No.: 15/592,691

(22) Filed: May 11, 2017

(65) Prior Publication Data

US 2017/0327223 A1  Nov. 16, 2017

(30) Foreign Application Priority Data

May 13, 2016 (JP) .................................. 2016-097397

(51) Int. Cl.
  *G05D 1/00* (2006.01)
  *G05D 1/10* (2006.01)
  (Continued)

(52) U.S. Cl.
  CPC ............. *B64C 39/024* (2013.01); *A61H 3/00* (2013.01); *A61H 3/008* (2013.01); *G05D 1/0011* (2013.01);
  (Continued)

(58) Field of Classification Search
  CPC .... A61H 3/00; A61H 3/008; A61H 2003/002; A61H 2201/501; A61H 2201/1659;
  (Continued)

(56) References Cited

U.S. PATENT DOCUMENTS 7,818,090 B2 * 10/2010 Okamoto ............. G05D 1/0272
    700/253
8,510,029 B2 * 8/2013 Curtis .................... G05D 1/024
    340/933
(Continued)

FOREIGN PATENT DOCUMENTS

JP  2010-058779 A   3/2010
JP  2015-184350     10/2015
JP  2016-045756 A   4/2016

OTHER PUBLICATIONS

Notice of Reasons for Refusal (Including Translation) for corresponding Japanese Application No. 2016-097397, dated Nov. 26, 2019.

*Primary Examiner* — Jerrah Edwards
(74) *Attorney, Agent, or Firm* — Thaine Lennox-Gentle; Sheridan Ross, PC

(57) ABSTRACT

Provided are an unmanned aerial vehicle executing medical support work and assisting in the work supposed to be performed by a health care worker or replacing the health care worker and a medical support method for performing medical support work by using an unmanned aerial vehicle. An unmanned aerial vehicle capable of performing autonomous flight includes a receiving unit receiving an input of medical support work from a health care worker and a control unit controlling the execution of the medical support work based on content of the input received by the receiving unit.

20 Claims, 8 Drawing Sheets

(51) Int. Cl.
*A61H 3/00* (2006.01)
*B64C 39/02* (2006.01)

(52) U.S. Cl.
CPC ....... *G05D 1/101* (2013.01); *A61H 2003/002* (2013.01); *A61H 2201/1659* (2013.01); *A61H 2201/501* (2013.01); *A61H 2201/5007* (2013.01); *B64C 2201/12* (2013.01); *B64C 2201/126* (2013.01); *B64C 2201/14* (2013.01); *B64C 2201/141* (2013.01); *B64C 2201/146* (2013.01)

(58) Field of Classification Search
CPC .......... A61H 2201/5007; B64C 39/024; B64C 2201/14; B64C 2201/12; B64C 2201/126; B64C 2201/146; B64C 2201/141; G05D 1/0011; G05D 1/101
See application file for complete search history.

(56) References Cited

U.S. PATENT DOCUMENTS

| | | | |
|---|---|---|---|
| 8,715,236 B2 * | 5/2014 | Barrelli | A61M 5/14244 417/477.8 |
| 8,849,679 B2 * | 9/2014 | Wang | H04N 7/185 700/245 |
| 9,307,383 B1 * | 4/2016 | Patrick | H04W 4/90 |
| 9,471,059 B1 | 10/2016 | Wilkins | |
| 9,529,359 B1 * | 12/2016 | Annan | G05D 1/0016 |
| 9,646,283 B2 * | 5/2017 | Kantor | G08G 5/0013 |
| 9,671,787 B2 | 6/2017 | Foinet et al. | |
| 9,827,680 B2 * | 11/2017 | Davey | G06F 19/3456 |
| 9,945,931 B2 * | 4/2018 | Allen | G01S 5/12 |
| 10,077,110 B2 * | 9/2018 | Erickson | B64C 39/024 |
| 2006/0106496 A1 * | 5/2006 | Okamoto | G05D 1/0272 700/253 |
| 2009/0125147 A1 * | 5/2009 | Wang | H04N 7/185 700/264 |
| 2013/0090802 A1 * | 4/2013 | Curtis | G05D 1/024 701/25 |
| 2013/0237915 A1 * | 9/2013 | Barrelli | A61M 5/14244 604/136 |
| 2016/0189101 A1 * | 6/2016 | Kantor | G08G 5/0013 705/338 |
| 2016/0351089 A1 * | 12/2016 | Salem | G09F 21/12 |
| 2017/0199269 A1 * | 7/2017 | Allen | G01S 5/12 |
| 2017/0266813 A1 * | 9/2017 | Davey | G06F 19/3456 |
| 2017/0334558 A1 * | 11/2017 | Erickson | B64C 39/024 |

* cited by examiner

UNMANNED AERIAL VEHICLE AND MEDICAL SUPPORT METHOD

CROSS REFERENCE TO RELATED APPLICATIONS

The present application claims the benefit of priority, under 35 U.S.C. § 119(e), to Japanese Application No. 2016-097397, filed Mar. 13, 2016, entitled "UNMANNED AERIAL VEHICLE AND MEDICAL SUPPORT METHOD," the entire disclosure of which is incorporated herein by reference in its entirety, for all that it teaches and for all purposes.

FIELD OF THE INVENTION

The present invention generally relates to an unmanned aerial vehicle capable of performing autonomous flight and used in the medical field and a medical support method for performing medical support work by using an unmanned aerial vehicle.

BACKGROUND

Much attention has been paid in various industrial fields these days to the use of unmanned aerial vehicles, capable of performing autonomous flight, and called drones and the like. For example, attempts have been made to improve advertising effects by devising movement control for unmanned aerial vehicles equipped with digital signage (electronic signboards) (refer to Japanese Patent Application No. JP-A-2015-184350PTL).

SUMMARY

Problem Solved

In the medical industry, problems have arisen in the form of labor shortage related to health care workers (such as doctors, nurses, pharmacists, physical therapists, occupational therapists, caregivers, and medical clerks) that is attributable to rapid aging of the population, a decline in medical service quality attributable to the labor shortage, medical divide between large cities and provincial cities, and soaring personnel expenses. Although medical robots, care robots, and the like are currently being developed at a rapid pace so that the robots can assist in some of the work of the health care workers, it will take many years until the robots are actually put to use at medical sites and do their jobs to the point of significantly reducing those people's work burden.

The embodiments herein address the problems above in the medical industry, formulating a solution based on the use of an unmanned aerial vehicle that is capable of performing autonomous flight.

An object of the present disclosure is to provide an unmanned aerial vehicle executing medical support work and assisting in the work supposed to be performed by a health care worker or replacing the health care worker and a medical support method for performing medical support work by using an unmanned aerial vehicle.

Solution

An unmanned aerial vehicle, which is an unmanned aerial vehicle capable of performing autonomous flight, includes a receiving unit receiving an input of medical support work from a health care worker and a control unit controlling execution of the medical support work based on content of the input received by the receiving unit.

A medical support method, which is a medical support method for performing medical support work by using an unmanned aerial vehicle capable of performing autonomous flight, includes a receiving step receiving processing content from a health care worker via a receiving unit of the unmanned aerial vehicle and a control step controlling the execution of the medical support work following the processing content by using a control unit of the unmanned aerial vehicle.

Advantageous Effects

According to the unmanned aerial vehicle or the medical support method aforementioned, the medical support work following the processing content designated by the health care worker is executed at a medical site. By executing the medical support work, the unmanned aerial vehicle assists in the work supposed to be performed by the health care worker or replaces the health care worker. Accordingly, a decline in medical service quality attributable to labor shortage or the like can be suppressed and personnel expenses at the medical site can be reduced.

DETAILED DESCRIPTION

Figure 1:
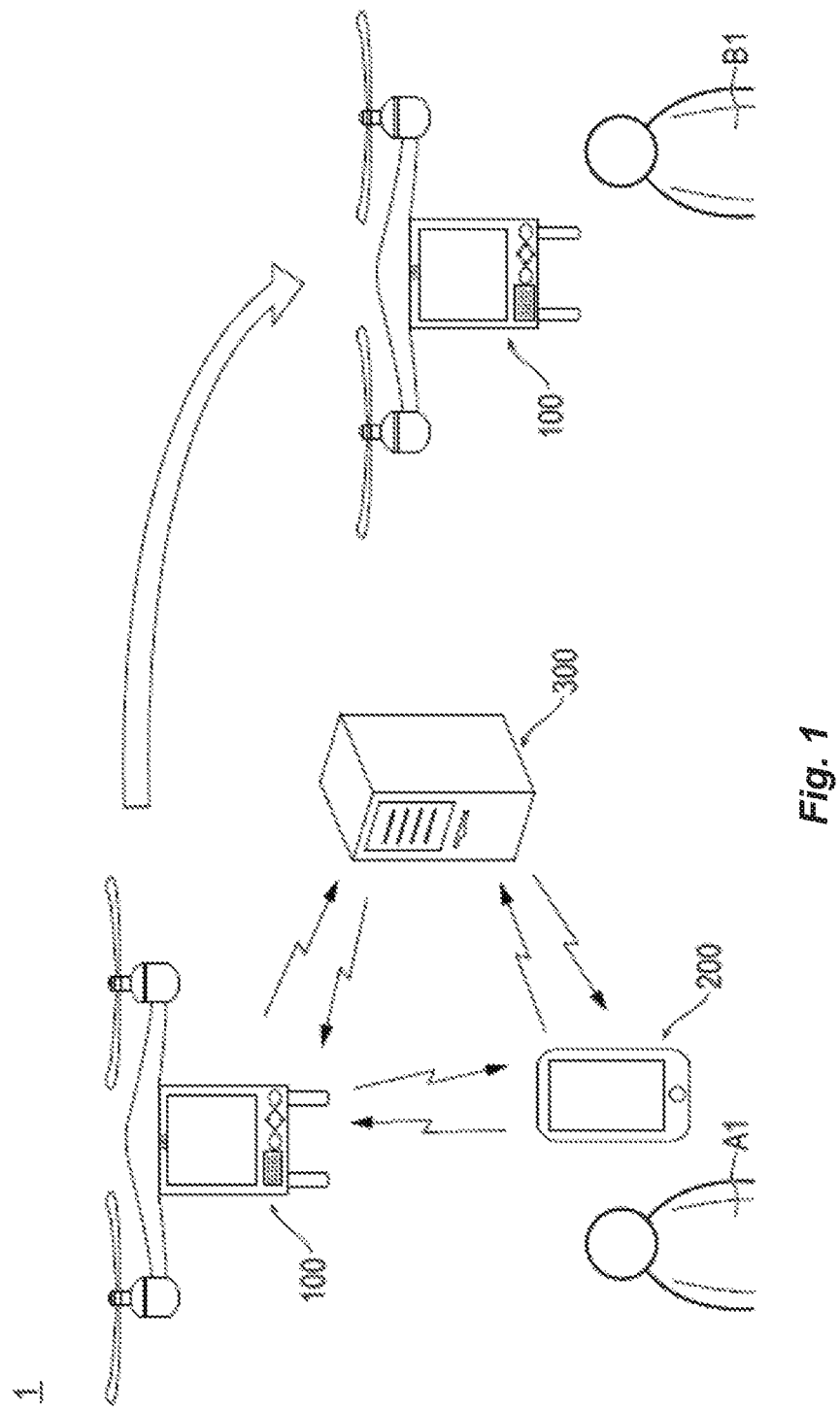
FIG. 1 is a conceptual diagram illustrating a medical support system in accordance with at least some embodiments of the present disclosure.

Hereinafter, embodiments of the present disclosure will be described with reference to accompanying drawings. The following description does not limit the technical scope of and the significance of terms in the scope of claims. Dimension ratios in the drawings are exaggerated for convenience of description and differ from actual ratios in some cases.

An overview of a medical support system 1 established in a hospital 500 will be described first. FIG. 1 is a conceptual diagram illustrating the medical support system 1.

The medical support system 1 has an unmanned aerial vehicle 100 capable of performing autonomous flight, an information terminal device 200 transmitting a transmission command to the unmanned aerial vehicle 100, and a management server 300 performing data transmission and reception to and from the unmanned aerial vehicle 100 and the information terminal device 200.

The unmanned aerial vehicle 100 is a flying device flying in the air and moving to a desired destination. The unmanned aerial vehicle 100 has a calculation processing function based on a central processing unit (CPU) and a function to perform wireless communication with the information terminal device 200 and the management server 300 via, for example, a base station (not illustrated).

The unmanned aerial vehicle 100 receives an input of medical support work designated by a health care worker A1 through the information terminal device 200. Once the input of the medical support work is received, the unmanned aerial vehicle 100 performs various types of work related to medical work in cooperation with another person (such as another health care worker) B1 or provides a medical service for another person (such as an inpatient) B1. Details of the medical support work executed by the unmanned aerial vehicle 100 will be described later.

The information terminal device 200 is a terminal device carried by the health care worker A1. For example, the information terminal device 200 can be made up of a portable terminal device that has a calculation processing function based on a CPU (a smartphone, a portable communication device that does not have a call function, or the like).

The information terminal device 200 is equipped with a function to perform the wireless communication with the unmanned aerial vehicle 100 and the management server 300 via, for example, the base station (not illustrated), a function to execute an application started when the medical support work by the unmanned aerial vehicle 100 is executed, an imaging function to capture a still image and/or a moving image, and a global positioning system (GPS) function to detect a position of the information terminal device 200.

Examples of communication methods of the unmanned aerial vehicle 100 and the information terminal device 200 include code division multiple access (CDMA), frequency division multiple access (FDMA), time division multiple access (TDMA), wideband code division multiple access (W-CDMA), a personal handyphone system (PHS), etc. In addition, the unmanned aerial vehicle 100 and the information terminal device 200 can be provided with a function corresponding to a method of communication by an internet protocol (IP) packet incompliance with wireless local area network (LAN) standards as a wireless interface.

The management server 300 is a server device managing the entire system and performs, for example, management of the unmanned aerial vehicle 100, management of information on a user using the unmanned aerial vehicle 100, and data collection management.

The management server 300 is connected to the unmanned aerial vehicle 100 and the information terminal device 200 via a wireless communication network. The management server 300 includes a function as a web server, performs transmission and reception of, for example, Hypertext Markup Language (HTML) data, image data, voice data, and music data by using a known system such as the World Wide Web (WWW), and performs accumulation of each of the data. Each of the data can be delivered from the management server 300 to the unmanned aerial vehicle 100 in response to a request through the application executed on the information terminal device 200.

The data transmission and reception between the unmanned aerial vehicle 100 and the management server 300 and the data transmission and reception between the information terminal device 200 and the management server 300 may be performed through a communication network network-connected via a predetermined relay device (such as a modem, a terminal adapter, and a gateway device). A distributed communication network established in a hospital selected as a place where the management server 300 is installed, for example, can be used as this communication network. The distributed communication network can be established by, for example, various communication lines (such as a dedicated line and a public line like telephone, Integrated Services Digital Network (ISDN), asymmetric digital subscriber line (ADSL), and optical lines) being connected to each other by communication protocol Transmission Control Protocol/Internet Protocol (TCP/IP) being used.

Figure 2A:
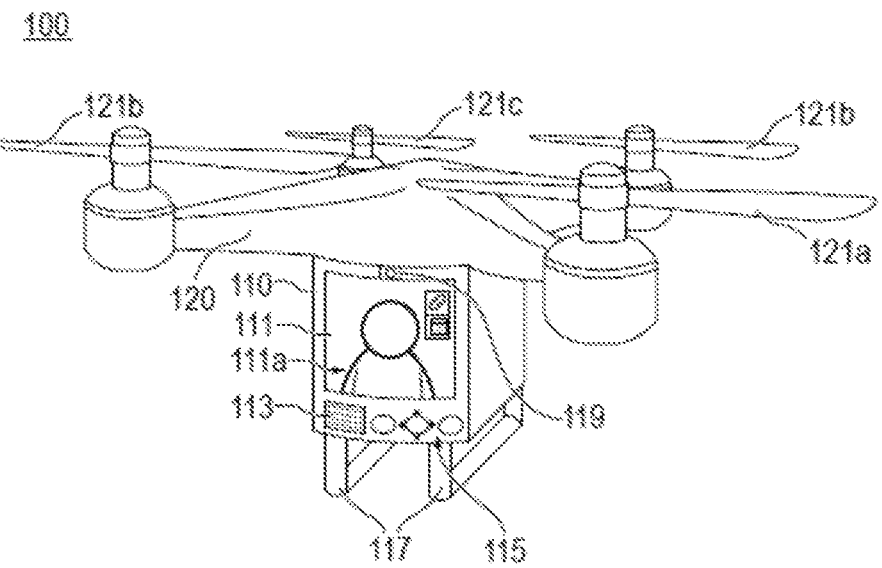
FIG. 2A is a perspective view of an unmanned aerial vehicle in accordance with at least some embodiments of the present disclosure.

Hereinafter, configuration of each portion of the unmanned aerial vehicle 100 will be described with reference to FIG. 2. FIG. 2A is a perspective view of the unmanned aerial vehicle 100 and FIG. 2B is a front view of the unmanned aerial vehicle 100.

Figure 2B:
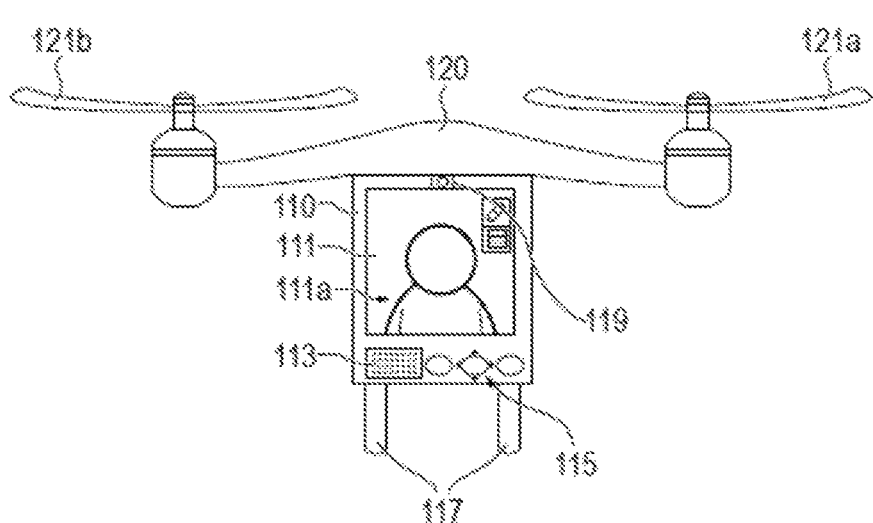
FIG. 2B is a front view of the unmanned aerial vehicle in accordance with at least some embodiments of the present disclosure.

As illustrated in FIGS. 2A and 2B, the unmanned aerial vehicle 100 has a main body portion 110 and an upper housing 120 attached to the main body portion 110.

The main body portion 110 has a display unit 111 capable of displaying an image, a speaker 113 capable of outputting sounds including voice and music, various operation buttons 115 operated during, for example, switching of content of the display by the display unit 111 and adjustment of the volume of the speaker 113, a load receiving unit 117 for holding an article or the like as a transport object, and an imaging unit 119 capable of capturing still image and moving image.

The display unit 111 can be made up of a liquid crystal display. The display unit 111 can be made up of a capacitive touch panel or the like as well. The speaker 113 can be made up of, for example, a known acoustic speaker used for voice and music output. The imaging unit 119 can be made up of, for example, known digital still and video cameras used for still image and moving image capturing.

Figure 3A:
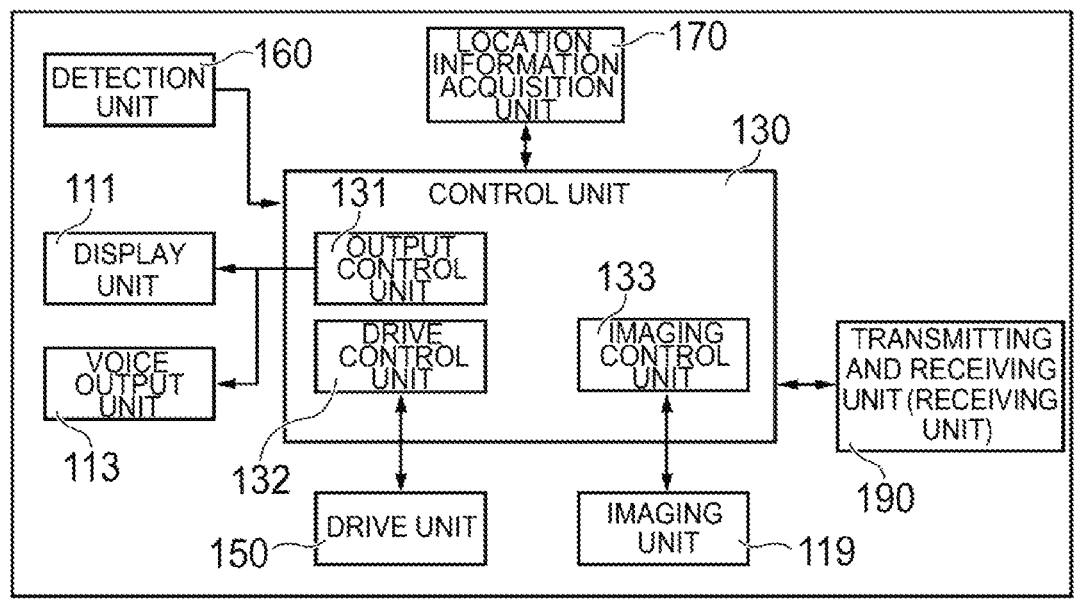
FIG. 3A is a block diagram schematically illustrating an internal structure of the unmanned aerial vehicle in accordance with at least some embodiments of the present disclosure.

Also disposed in the main body portion 110 are a drive unit 150 (not illustrated), a detection unit 160 (not illustrated), a location information acquisition unit 170 (not illustrated), and a transmitting and receiving unit 190 (not illustrated) (refer to FIG. 3A).

The drive unit 150 is a device for giving a rotational drive force to each of rotary blades 121a, 121b, 121c, and 121d disposed on the upper housing 120. The drive unit 150 can be made up of, for example, an electric motor, a drive actuator, and various gear groups.

The detection unit 160 is disposed for acquisition of various types of information such as the altitude, velocity, and direction of movement of the unmanned aerial vehicle 100 and the vehicle's distance from an obstacle. An appropriate combination of, for example, an acceleration sensor, a gyro sensor, a magnetic sensor, and an obstacle-sensing radar sensor can constitute the detection unit 160.

The location information acquisition unit 170 is a module acquiring a current location of the unmanned aerial vehicle 100. The location information acquisition unit 170 is provided with, for example, a GPS function and a function to find out the current location from information such as the intensity of a signal from a radio base station.

When the unmanned aerial vehicle 100 is approaching a predetermined facility during the flight, the unmanned aerial vehicle 100 provides notification to that effect based on the information acquired by the location information acquisition unit 170. The unmanned aerial vehicle 100 has not only the notification function but also a "facility avoidance function", which is to make impossible the flight along a route approaching the facility or perform route selection so that the flight is performed via a bypass route. Alarm notification performed through the display unit 111, the speaker 113, or the like can be adopted as a method for the notification. The operation control for making the flight impossible and the bypass route selection can be incorporated in advance as a type of operation processing in a medical support operation program executed by a control unit 130. Examples of the facility aforementioned include the official residence of the Prime Minister of Japan, its central ministries, and facilities of importance such as a nuclear power plant in a case where Japan is home to the facility. The unmanned aerial vehicle 100 is configured to execute the facility avoidance function in a case where, for example, it trespasses on a predetermined range around the facility aforementioned (such as a range of 300 m to 1,000 m and a range of 300 m in particular).

The transmitting and receiving unit 190 performs wireless data communication via a wireless communication network. In addition, the transmitting and receiving unit 190 has a function as a receiving unit receiving the input of the medical support work designated by the health care worker A1. The transmitting and receiving unit 190 can be made up of a module also provided with a wireless communication function such as a WiFi™ (registered trademark) module and a Bluetooth™ (registered trademark) module. Its communication method is not limited to the wireless communication aforementioned. For example, contactless short-range wireless communication and wired communication may be adopted instead.

The four rotary blades 121a, 121b, 121c, and 121d placed at four corners of the upper housing 120 are disposed on the upper housing 120. The unmanned aerial vehicle 100 performs a movement in a vertical direction, a movement in a horizontal direction, and hovering for staying for a certain period of time in the air, and the like by generating lift by rotationally driving each of the rotary blades 121a, 121b, 121c, and 121d.

In a standby state where no medical support work is executed, the unmanned aerial vehicle 100 stands by in a standby room R1 in the hospital 500 as described later (refer to FIG. 6). For example, a charging stand on which the unmanned aerial vehicle 100 is capable of landing can be installed in the standby room R1. By the charging stand being installed in the standby room R1, the unmanned aerial vehicle 100 is capable of landing on the charging stand and wired or wireless charging of the unmanned aerial vehicle 100 can be performed while the unmanned aerial vehicle 100 stands by.

The configuration of each portion of the unmanned aerial vehicle 100 (the layout, dimension, color, exterior design, and the like of each member constituting it), materials constituting the respective portions of the unmanned aerial vehicle 100, and the like are not particularly limited insofar as the medical support work by the unmanned aerial vehicle 100 can be executed. For example, the unmanned aerial vehicle 100 may be configured to have a frame material installed around each of the rotary blades 121a, 121b, 121c, and 121d so that contact with the other members is prevented, an arm capable of gripping the article may be disposed on the load receiving unit 117, and the display unit 111, the speaker 113, and the like may be placed on a side surface or the like as well as a front face of the main body portion 110.

Hereinafter, an internal structure of the unmanned aerial vehicle 100 will be described with reference to FIG. 3A. FIG. 3A is a block diagram schematically illustrating the internal structure of the unmanned aerial vehicle 100.

As illustrated in FIG. 3A, the unmanned aerial vehicle 100 has the control unit 130 comprehensively controlling operations of the unmanned aerial vehicle 100. The control unit 130 has the CPU performing calculation processing, a read-only memory (ROM) storing the medical support operation program, a random access memory (RAM) (equivalent to a storage unit) for storing various types of data, and an electrically erasable programmable read-only memory (EEPROM) storing image data and sound data.

The control unit 130 functions as an output control unit 131 controlling content output by the display unit 111 and the speaker 113, a drive control unit 132 controlling the drive unit 150, and an imaging control unit 133 controlling the imaging unit 119 by executing the medical support operation program stored in the ROM.

The output control unit 131 performs control for outputting a predetermined image such as the still image and the moving image on the display unit 111 and control for outputting a sound such as voice and music by using the speaker 113 based on the medical support operation program. The image output on the display unit 111 and the sound output by the speaker 113 are appropriately output depending on content of the medical support work designated by the health care worker A1.

The drive control unit 132 controls the movement of the unmanned aerial vehicle 100 based on information on the location of the unmanned aerial vehicle 100. Objects controlled by the drive control unit 132 include the altitude and velocity of the unmanned aerial vehicle 100 during its movement and a movement path for reaching the destination from a place of stay of the health care worker A1 (movement path toward a medical site where the medical support work is executed). The movement path is stored in advance in the RAM before the execution of the medical support work by the unmanned aerial vehicle 100 and is read by the medical support operation program being executed. The drive control unit 132 teaches the movement path of the unmanned aerial vehicle 100 based on the read content.

The RAM is capable of storing a plurality of the movement paths depending on applications of the unmanned aerial vehicle 100. For example, the movement paths can include at least one of a "movement path for moving between different places in hospital", a "movement path for moving between different pharmacies", and a "movement path for moving between hospital or pharmacy and home care patient's place of stay". In a case where the unmanned aerial vehicle 100 is used only in the hospital, the "movement path for moving between different places in hospital" can be stored alone in the RAM. In a case where the unmanned aerial vehicle 100 is used both in and out of the hospital, any two or more of the movement paths aforementioned, a movement path other than the examples aforementioned, and the like can be stored in the RAM.

The imaging control unit 133 controls each of constituting members provided in the imaging unit 119 such as its lens, shutter, aperture, focus, and zoom. For example, the imaging control unit 133 performs control for a change in lens direction (direction of the lens) and viewing angle adjustment based on a change in the posture of the unmanned aerial vehicle 100 without the lens direction change.

Examples of the medical support work that the unmanned aerial vehicle 100 executes based on the medical support operation program can include at least one of "information transmission between health care workers", "information transmission between health care worker and recipient of medical service provided by the health care worker", "article transport", and "patient motion assistance".

Examples of the "information transmission between health care workers" include instruction transmission from a doctor to a nurse, reporting work from a nurse to a doctor, reporting work between doctors, dispensing discrimination work performed between pharmacists, and instruction transmission from a doctor to a pharmacist.

Examples of the "information transmission between health care worker and recipient of medical service provided by the health care worker" include patient examination by a doctor, examination result reporting from a doctor to a patient, and medicine management guidance work by a pharmacist.

Examples of the "article transport" include transport of articles for medical use (such as medical equipment, medicine, clinical records, and storage mediums like compact discs (CDs) and digital video discs (DVDs) storing various types of data acquired by inspection) between hospital rooms, medicine transport from a pharmacist to a patient, and medicine transport from a pharmacy to a home care patient.

Examples of the "patient motion assistance" include patient motion assistance for walking, patient motion assistance for standing up from a bed, patient motion assistance for sitting on or lying in a bed, patient motion assistance for standing up from a wheelchair, and patient motion assistance for sitting in a wheelchair.

The medical support work executed by the unmanned aerial vehicle 100 may have any content insofar as it is equivalent to work and jobs supposed to be performed by the health care worker A1 and the examples aforementioned do not limit the specific content of the work. Examples of the health care worker A1 can include doctors, nurses, pharmacists, physical therapists, occupational therapists, caregivers, and medical clerks. The health care worker A1 is not limited to the examples though, and the examples may also include volunteer staff and workers executing speed processing distribution (SPD) work to supply medical facilities with supplies such as medical consumables.

Figure 3B:
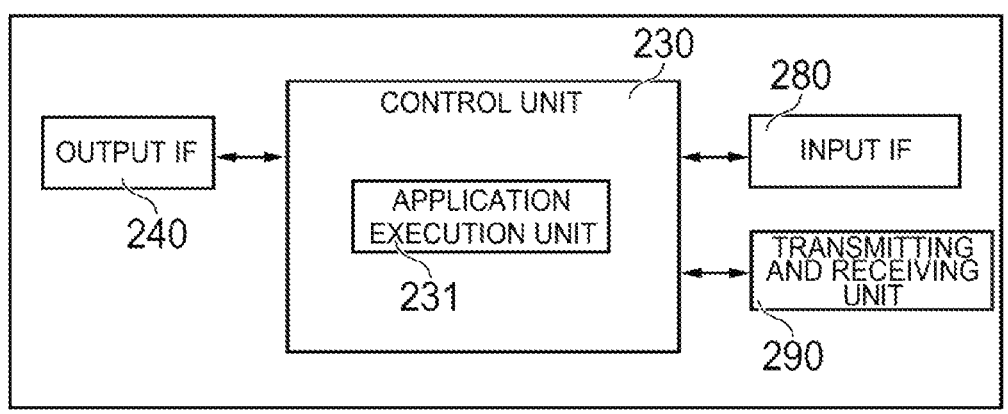
FIG. 3B is a block diagram schematically illustrating an internal structure of an information terminal device in accordance with at least some embodiments of the present disclosure.

Hereinafter, an internal structure of the information terminal device 200 will be described with reference to FIG. 3B. FIG. 3B is a block diagram schematically illustrating the internal structure of the information terminal device 200.

As illustrated in FIG. 3B, the information terminal device 200 has a control unit 230 comprehensively controlling operations of the information terminal device 200, an output interface 240, an input interface 280, and a transmitting and receiving unit 290. Some configurations such as an imaging unit are not illustrated in FIG. 3B.

The control unit 230 has the CPU performing calculation processing, a ROM storing a predetermined application, a RAM for storing various types of data, and an EEPROM storing image data and sound data.

The output interface (IF) 240 can be made up of, for example, a display unit capable of displaying an image or the like and a speaker capable of outputting sounds including voice and music. The display unit and the speaker can have a similar configuration to, for example, those disposed in the unmanned aerial vehicle 100.

The input interface 280 can be made up of a capacitive touch panel also provided with a function as a display unit capable of displaying an image. The input interface 280 can also be made up of, for example, an operation button allowing a user operation input and a microphone allowing a voice input.

The transmitting and receiving unit 290 performs data transmission and reception via a wireless communication network and transmits the transmission command to the unmanned aerial vehicle 100. The transmitting and receiving unit 290 can have a similar configuration to, for example, the wireless module disposed in the unmanned aerial vehicle 100.

The control unit 230 has a function as an application execution unit 231 executing a medical support application. The medical support application can be made up of, for example, a general OS and browser software.

In a case where the medical support work is allowed to be executed by the unmanned aerial vehicle 100, the health care worker A1 starts the medical support application on the information terminal device 200 by operating the information terminal device 200. By operating the information terminal device 200, the health care worker A1 selects the medical support work to be executed by the unmanned aerial vehicle 100. The information terminal device 200 transmits a result of the selection by the health care worker A1 to the unmanned aerial vehicle 100, through the wireless communication network, and as the transmission command. The unmanned aerial vehicle 100 receives the transmission command via the transmitting and receiving unit (receiving unit) 190 and receives the work content. After receiving the work content, the unmanned aerial vehicle 100 executes the medical support work in accordance with the selected work content.

Figure 4A:
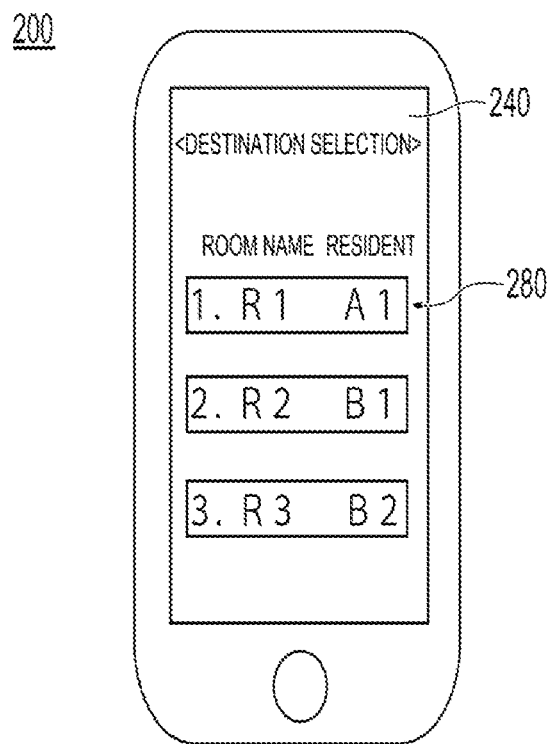
FIGS. 4A and 4B are diagrams illustrating an example of a selection screen displayed on the information terminal device in accordance with at least some embodiments of the present disclosure.
Figure 4B:
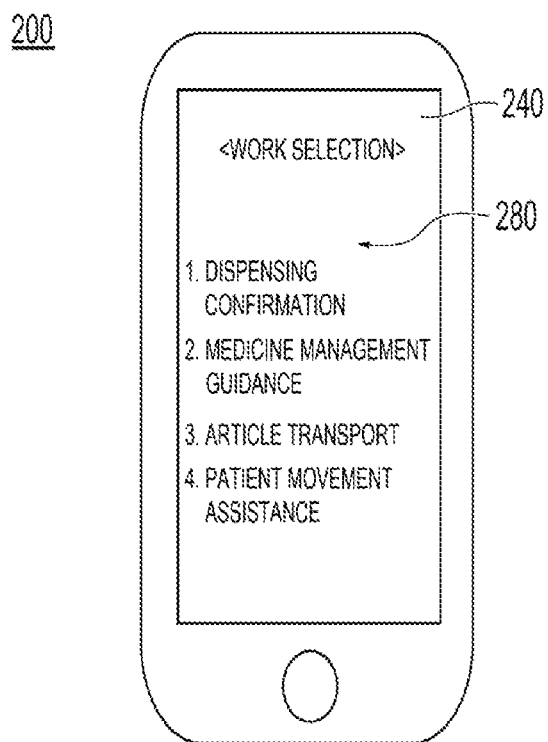

An example of a selection screen displayed on the output IF (display unit) 240 of the information terminal device 200 is illustrated in FIGS. 4A and 4B.

"Destination selection screen" illustrated in FIG. 4A is displayed once the medical support application is started on the information terminal device 200. The destination selection screen displays, for example, the names of rooms in the hospital 500 and the names of residents in the rooms. The health care worker A1 confirms the destination of the unmanned aerial vehicle 100 and an object person on this selection screen and selects desired content. The selection can be performed by the input IF (touch panel function on the display unit) 280 being used.

In the medical support application, for example, a room where no object person of the medical support work is present may not be displayed. In a case where a plurality of the object persons is present in one room, the medical support application may display all of the object persons.

"Work selection screen" illustrated in FIG. 4B is displayed once the destination is selected on the medical support application. The health care worker A1 selects the content of the work to be executed by the unmanned aerial vehicle 100 on this selection screen.

In the medical support application, for example, the content of the work that cannot be provided for the object person selected on the destination selection screen may not be displayed and an input of the content of the work that cannot be provided may be limited so that it is not received.

Once the health care worker A1 selects the work content, the medical support application displays a confirmation screen for a confirmation of whether to execute extra medical support work. Once the health care worker A1 performs an input to the effect of extra medical support work execution, the medical support application displays the "destination selection screen" illustrated in FIG. 4A again and receives destination selection. In a case where no extra medical support work is executed, the medical support application receives the effect and then completes input receipt.

In a case where both the destination and the work content have been selected by the health care worker A1, the medical support work of the unmanned aerial vehicle 100 is continuously executed in accordance with the order of the selection.

Update of information related to the destination, update of information related to the residents (supported persons), update of the medical support application, and the like can be regularly or irregularly performed via, for example, the management server 300. In a case where the object person's place of stay has changed and in a case where the medical support work that can be provided for the object person has changed, for example, update can be performed such that display content of each selection screen of the medical support application changes in accordance with content of the changes.

The selection screen and application execution content and the like illustrated in FIGS. 4A and 4B are merely one example and can be appropriately changed.

Hereinafter, the content of the work that can be executed by the unmanned aerial vehicle 100 will now be described. The unmanned aerial vehicle 100 is configured to be capable of executing the four types of work content that are illustrated in FIG. 4B.

"Dispensing confirmation" is work performed for the purpose of preventing an error occurring throughout dispensing work performed by a pharmacist. Inspection is an example of work performed by pharmacists. The inspection is performed by a pharmacist other than the pharmacist performing the medicine dispensing (preparation) and is work for determining whether dispensing content or the like is free from errors. In a case where the dispensing pharmacist has little experience, checking by the other pharmacist is performed as the case may be so that whether the dispensing content is free from errors is to be found out. The "dispensing confirmation" includes these types of confirmation work supposed to be performed by pharmacists. In a case where the dispensed medicine is confirmed, involvement of the pharmacist other than the dispensing pharmacist is required, and thus a plurality of pharmacists has to be ensured as personnel. The use of the unmanned aerial vehicle 100 allows the dispensing confirmation to be smoothly and quickly performed even in a case where no extra pharmacist is available around the dispensing pharmacist and in a case where the other pharmacist has no time to spare because of circumstances such as a busy season.

"Medicine management guidance" is support work for improving patients' drug therapy awareness via inpatient medication history management and inpatient medication guidance. This work is usually performed face to face between a pharmacist and an inpatient. Accordingly, the pharmacist himself or herself is required to visit a ward or the like where the inpatient stays and spend his or her time on explanation. In a case where the pharmacist has no time to spare and a sufficient length of time is rarely available, no time can be spared for the visit to the patient for the explanation by the pharmacist himself or herself. With the unmanned aerial vehicle 100, waste of time attributable to place-related constraints can be suppressed, and thus time spent on the medicine management guidance by pharmacists can be ensured.

During the execution of the "dispensing confirmation" and the "medicine management guidance", the unmanned aerial vehicle 100 performs reporting and description by displaying a predetermined display image 111a in the display unit 111 (refer to FIGS. 2A and 2B). During the reporting and description, the unmanned aerial vehicle 100 may output an image preserved in advance (still image and/or moving image) or output the image and voice of the health care worker A1 in real time through the transmitting and receiving unit 290 of the information terminal device 200.

Figure 7:
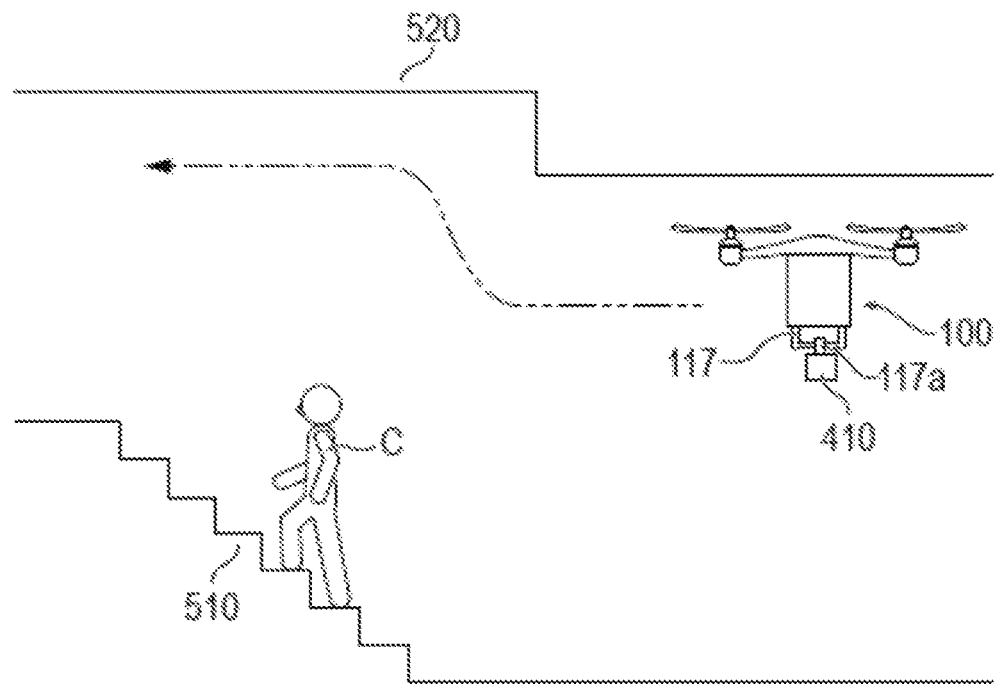
FIG. 7 is a diagram for showing an example of the medical support work of the unmanned aerial vehicle in accordance with at least some embodiments of the present disclosure.

"Article transport" is work for assisting in the transport of an article 410 such as medicine, a medical appliance, and a clinical record (refer to FIG. 7). The work burden of a nurse and the like can be reduced by the article 410 being transported between the different rooms in the hospital 500 based on the use of the unmanned aerial vehicle 100. Specific examples of the transport work include work for delivering medicine brought by an inpatient to the inpatient, work for delivering medicine to be taken soon to the inpatient, and work for collecting unnecessary medicine from the patient.

The "article transport" can be simultaneously executed with the other work content. Accordingly, input receipt may be simultaneously performed with, for example, the other work on the medical support application aforementioned.

Figure 8:
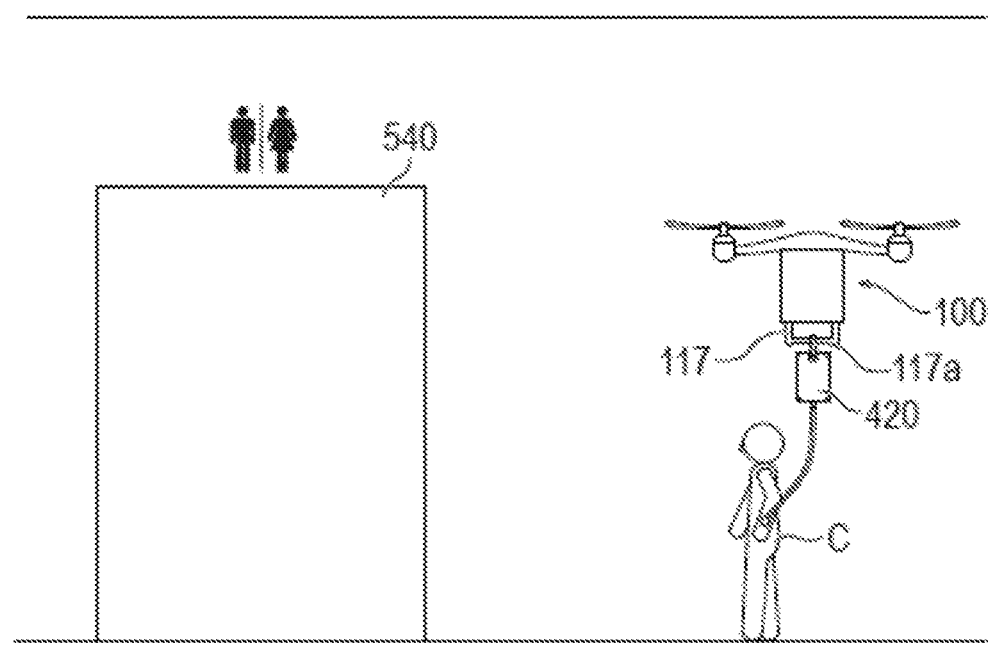
FIG. 8 is a diagram for showing the example of the medical support work of the unmanned aerial vehicle in accordance with at least some embodiments of the present disclosure.

"Patient motion assistance" is, for example, work for providing ambulatory assistance for a patient C receiving an intravenous drip (refer to FIG. 8). When the unmanned aerial vehicle 100 is moved in step with the ambulation of the patient C with an intravenous drip bag 420 held by the unmanned aerial vehicle 100, the patient C can be guided to a toilet 540 or the like without an intravenous drip stand or the like being carried around. Since the unmanned aerial vehicle 100 is afloat and moves in the air, the unmanned aerial vehicle 100 is hindered by nothing even when the patient C goes up in a stairway 510 (refer to FIG. 7) and is capable of helping the patient C so that his or her ambulation is smooth. In a case where a movement of a patient relying on a wheelchair is assisted in based on the use of the unmanned aerial vehicle 100, the patient does not have to carry around an intravenous drip stand, and thus a smooth wheelchair movement can be realized.

The "patient motion assistance" may be any work for the purpose of assisting in a motion performed by the patient C. For example, it may also be work for assisting in motions of the patient C other than the ambulation. Examples of the motions other than the ambulation include the motion of the patient C sitting on or lying in a bed, the motion of the patient C standing up from a bed, the motion of the patient standing up from a wheelchair, and a motion for sitting in a wheelchair. When the movement assistance and the assistance for the other motions are performed, the patient C may be directly provided with power for the motions to be performed from the unmanned aerial vehicle 100 or may be indirectly provided with the power for the motions to be performed via a health care worker or the like interposed between the unmanned aerial vehicle 100 and a member connected to the unmanned aerial vehicle 100 (such as a string and a rod). A handrail that can be gripped by the patient C or the like can be disposed or a cover material or the like storing each of the illustrated rotary blades 121a, 121b, 121c, and 121d can be disposed on the unmanned aerial vehicle 100 depending on the content (application) of the assistance work aforementioned.

When the "article transport" and the "patient motion assistance" are allowed to be executed by the unmanned aerial vehicle 100, the article 410 and the intravenous drip bag 420 can be held by, for example, a predetermined accessory component 117a being attached to the load receiving unit 117 of the unmanned aerial vehicle 100 as illustrated in FIGS. 7 and 8. For example, a member that has the shape of a hanging ring and is configured to be removable from the load receiving unit 117 can be used as the accessory component 117a.

In a case where the unmanned aerial vehicle 100 is used in a facility such as the hospital 500, data related to routes in the facility and the height to a ceiling 520 are input to the unmanned aerial vehicle 100. As illustrated in FIG. 7, the control unit 130 controls the movement of the unmanned aerial vehicle 100 based on the input data such that contact with the ceiling 520, the other obstacles (such as walls and ornaments), and the like is avoided. In addition, the control unit 130 is capable of controlling the movement of the unmanned aerial vehicle 100 such that, for example, contact with the obstacles and the patient C is avoided by performing the movement while detecting the presence or absence of the obstacles by using the detection unit 160 (refer to FIG. 3A) that the unmanned aerial vehicle 100 is equipped with.

Hereinafter, an example of the execution of the medical support work by the unmanned aerial vehicle 100 will be described with reference to FIGS. 5 and 6.

Figure 5:
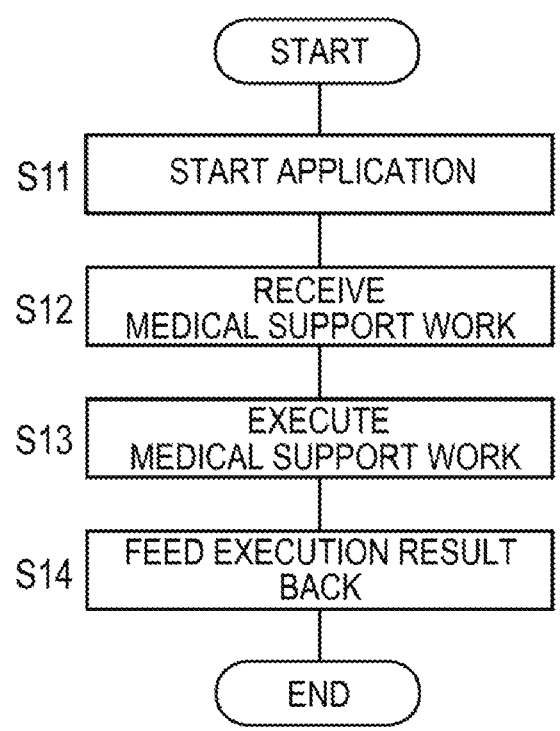
FIG. 5 is a flowchart illustrating a procedure example at a time when medical support work is performed in accordance with at least some embodiments of the present disclosure.

FIG. 5 shows a procedure example at a time when the medical support work is performed.

In allowing the medical support work to be executed by the unmanned aerial vehicle 100, the health care worker A1 starts the medical support application on the information terminal device 200 (S11). Then, the health care worker A1 selects the medical support work on the medical support application as aforementioned. The selection result is transmitted as the transmission command from the information terminal device 200 to the unmanned aerial vehicle 100. The unmanned aerial vehicle 100 receives the input of the work content based on the transmission command (S12). Once the receipt of the input of the work content is completed, the unmanned aerial vehicle 100 executes the medical support work (S13). After the execution of the medical support work, the unmanned aerial vehicle 100 performs execution result feedback with respect to the health care worker A1 (S14).

Figure 6:
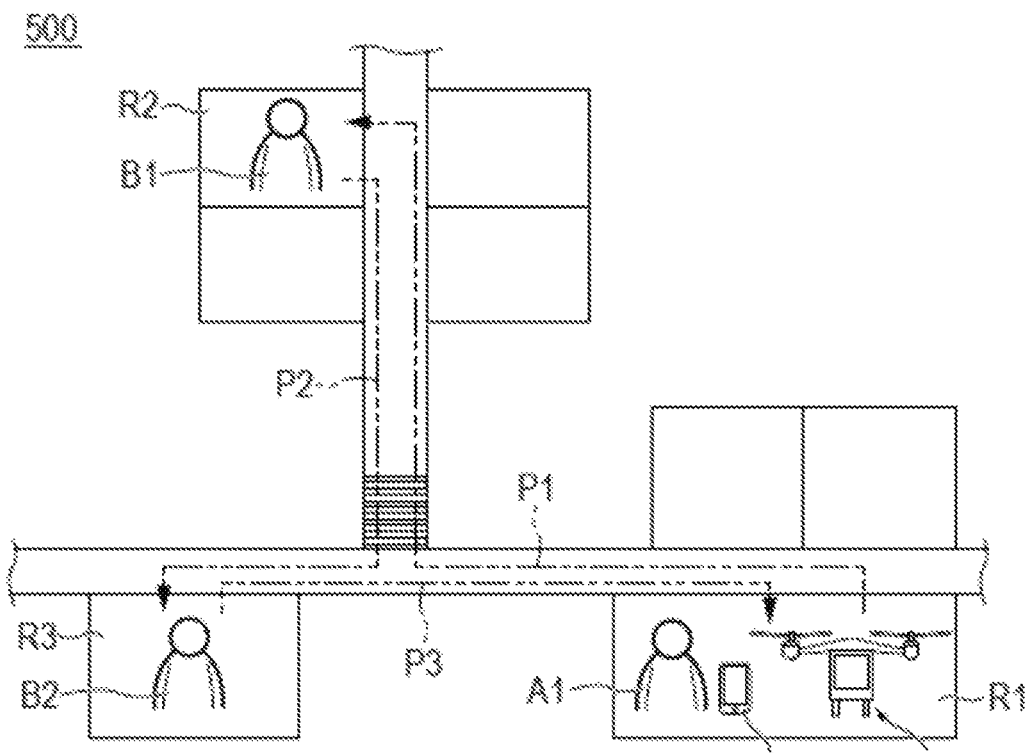
FIG. 6 is a diagram for showing a movement path of the unmanned aerial vehicle and the medical support work by the unmanned aerial vehicle in accordance with at least some embodiments of the present disclosure.

FIG. 6 shows an example of the use of the unmanned aerial vehicle 100 in the hospital 500.

In the example that is illustrated in FIG. 6, the health care worker A1 allows the unmanned aerial vehicle 100 to execute the "dispensing confirmation" and the "medicine management guidance". The unmanned aerial vehicle 100 performs the "dispensing confirmation" between the health care worker B1 and itself, and then performs the "medicine management guidance" with respect to a patient B2. In this example, the health care worker A1 is an in-hospital pharmacist in charge of the dispensing work as a whole (prescription receipt, dispensing, inspection, and administration) and the health care worker B1 is another in-hospital pharmacist to whom inspection work is entrusted by the health care worker A1. The patient B2 is an inpatient receiving the medicine management guidance from the health care worker A1.

Before the medical support work is performed, the unmanned aerial vehicle 100 stands by in the standby room R1 such as a dispensary where the health care worker A1 normally stays and an outpatient chemotherapy room (chemotherapy room). The unmanned aerial vehicle 100 stands by while being afloat at a height at which it does not hinder a person's movement or the like.

Upon receiving the work content selected by the health care worker A1, the unmanned aerial vehicle 100 leaves the standby room R1, moves along a movement path P1, and heads for a room R2, where the health care worker B1 stays. Each of the movement paths P1, P2, and P3 that are illustrated in the drawing is stored in advance in the RAM (storage unit) as the "movement path for moving between different places in hospital".

Upon reaching the room R2, the unmanned aerial vehicle 100 performs the "dispensing confirmation" via the display unit 111. Before the work is initiated, the unmanned aerial vehicle 100 confirms whether the object person and the work content are not erroneous. This confirmation can be performed by, for example, the confirmation screen being output to the display unit 111 or a confirmation voice being output from the speaker 113. After the unmanned aerial vehicle 100 confirms that the object person and the work content are not erroneous, the unmanned aerial vehicle 100 initiates the work.

After the termination of the dispensing confirmation, the health care worker B1 performs an input to the effect of work termination by operating the operation button 115 or performing a touch panel operation on the display unit 111. Once the termination of the dispensing confirmation is confirmed, the unmanned aerial vehicle 100 leaves the room R2, moves along the movement path P2, and heads for a room R3, where the patient B2 stays.

Upon reaching the room R3, the unmanned aerial vehicle 100 performs the "medicine management guidance" via the display unit 111. The unmanned aerial vehicle 100 performs confirmation work, as it does before the initiation of the "dispensing confirmation", to confirm that the object person and the work content are not erroneous.

After the termination of the medicine management guidance, the recipient B2 performs an input to the effect of medicine management guidance termination by operating the operation button 115 or performing a touch panel operation on the display unit 111. Once the termination of the medicine management guidance is confirmed, the unmanned aerial vehicle 100 leaves the room R3, moves along the movement path P3, and returns to the room R1.

After the returning to the room R1, the unmanned aerial vehicle 100 feeds back the results of the execution of the "dispensing confirmation" and the "medicine management guidance" with respect to the health care worker A1. The feedback can be performed by, for example, the display of an image indicating that the work has been successfully completed on the display unit 111 or the display of an image indicating that some of the work has yet to be executed on the display unit 111. Results of the feedback can be transmitted to the management server 300 and preserved.

The unmanned aerial vehicle 100 is capable of receiving requests and messages from the health care worker B1 and the patient B2 to the health care worker A1 before and after performing the medical support work. In a case where this receipt work is performed by the unmanned aerial vehicle 100, the health care worker A1 can check the requests and the messages after the unmanned aerial vehicle 100 returns to the standby room R1. The unmanned aerial vehicle 100 may also receive a command to the effect of work interruption from, for example, the health care worker A1 before each work is completed.

Hereinafter, effects of the embodiments described herein will be described.

The unmanned aerial vehicle 100 has the transmitting and receiving unit (receiving unit) 190 receiving the input of the medical support work from the health care worker A1 and the control unit 130 controlling the execution of the medical support work based on the input content received by the transmitting and receiving unit 190.

The unmanned aerial vehicle 100 executes the medical support work following the processing content that is designated by the health care worker A1 at the medical site. The unmanned aerial vehicle 100 assists in the work to be performed by the health care worker A1 or replaces the health care worker A1 by executing the medical support work. Accordingly, a decline in medical service quality attributable to labor shortage and so on can be suppressed and personnel expenses at the medical site can be reduced.

The medical support work that is executed by the unmanned aerial vehicle 100 includes the "information transmission between health care workers". Accordingly, the unmanned aerial vehicle 100 is capable of assisting in the work supposed to be performed between health care workers or replacing the health care workers, and thus medical services that have been given up on due to time-related constraints can be provided.

The medical support work that is executed by the unmanned aerial vehicle 100 includes the "article transport". Doctors' and nurses' work burden can be reduced based on the use of the unmanned aerial vehicle 100 for the transport of the articles designated by the health care worker A1. In a case where the transport work is performed in a facility such as the hospital 500, particular attention should be paid to contact with pedestrians and the like. By the use of the unmanned aerial vehicle 100, which is capable of moving in the air, the article 410 can be smoothly transported while avoiding contact with a pedestrian and the like.

The medical support work that is executed by the unmanned aerial vehicle 100 includes the "patient motion assistance". Accordingly, the work burden of the health care worker A1 can be significantly reduced by the use of the unmanned aerial vehicle 100.

The "information transmission between health care workers" that is executed by the unmanned aerial vehicle 100 includes the dispensing confirmation performed between different pharmacists. Accordingly, the dispensing confirmation can be performed by another pharmacist even in a case where no extra pharmacist is available around the dispensing pharmacist because of circumstances such as a busy season and in a case where there is no time to spare immediately after dispensing, and thus high-quality medical services can be provided.

The "information transmission between health care worker and recipient of provided medical service" that is executed by the unmanned aerial vehicle 100 includes the medicine management guidance. Accordingly, the medicine management guidance can be performed even in a case where, for example, the pharmacist has no time to spare due to other work, and thus high-quality medical services can be provided.

The control unit 130 has the RAM (storage unit) storing the movement paths directed toward the medical site where the medical support work is executed. The movement paths include the movement path for moving between different places in the hospital 500. Accordingly, the unmanned aerial vehicle 100 is automatically moved along the movement path set in advance when the unmanned aerial vehicle 100 executes the medical support work. The unmanned aerial vehicle 100 is capable of smoothly moving to the destination (room in the hospital and the like) while avoiding contact with obstacles or the like during its movement.

The transmitting and receiving unit (receiving unit) 190 is configured to be capable of receiving the transmission command transmitted from the information terminal device 200 operated by the health care worker A1. The control unit 130 controls the execution of the medical support work in accordance with the processing content that is included in the transmission command. Accordingly, various operations of the unmanned aerial vehicle 100 can be controlled based on the simple work of the operation of the information terminal device 200 by the health care worker A1.

A medical support method can include a receiving step receiving the processing content from the health care worker A1 via the transmitting and receiving unit (receiving unit) 190 that the unmanned aerial vehicle 100 is provided with and a control step controlling the execution of the medical support work in accordance with the processing content by the control unit 130 that the unmanned aerial vehicle 100 is provided with.

According to the method aforementioned, the unmanned aerial vehicle 100 executes the medical support work following the processing content that is designated by the health care worker A1 at the medical site. The unmanned aerial vehicle 100 assists in the work to be performed by the health care worker A1 or replaces the health care worker A1 by executing the medical support work. Accordingly, a decline in medical service quality attributable to labor shortage and so on can be suppressed and personnel expenses at the medical site can be reduced.

Modification examples will be described below. In the description of the modification examples, description of those that have the same functions as the already described members and configurations will be appropriately omitted. Regarding points not particularly mentioned with regard to device configuration and control content, configuration similar to that of the embodiments herein aforementioned can be carried out.

Modification Example 1

The example of the use of the unmanned aerial vehicle 100 in the hospital 500 has been described. The use of the unmanned aerial vehicle 100, however, is not limited to the use in the hospital 500. For example, the unmanned aerial vehicle 100 can also be used for pharmacies 600 and 700 outside hospitals and a residence 800 of a home care patient B3 as illustrated in FIG. 9.

Figure 9:
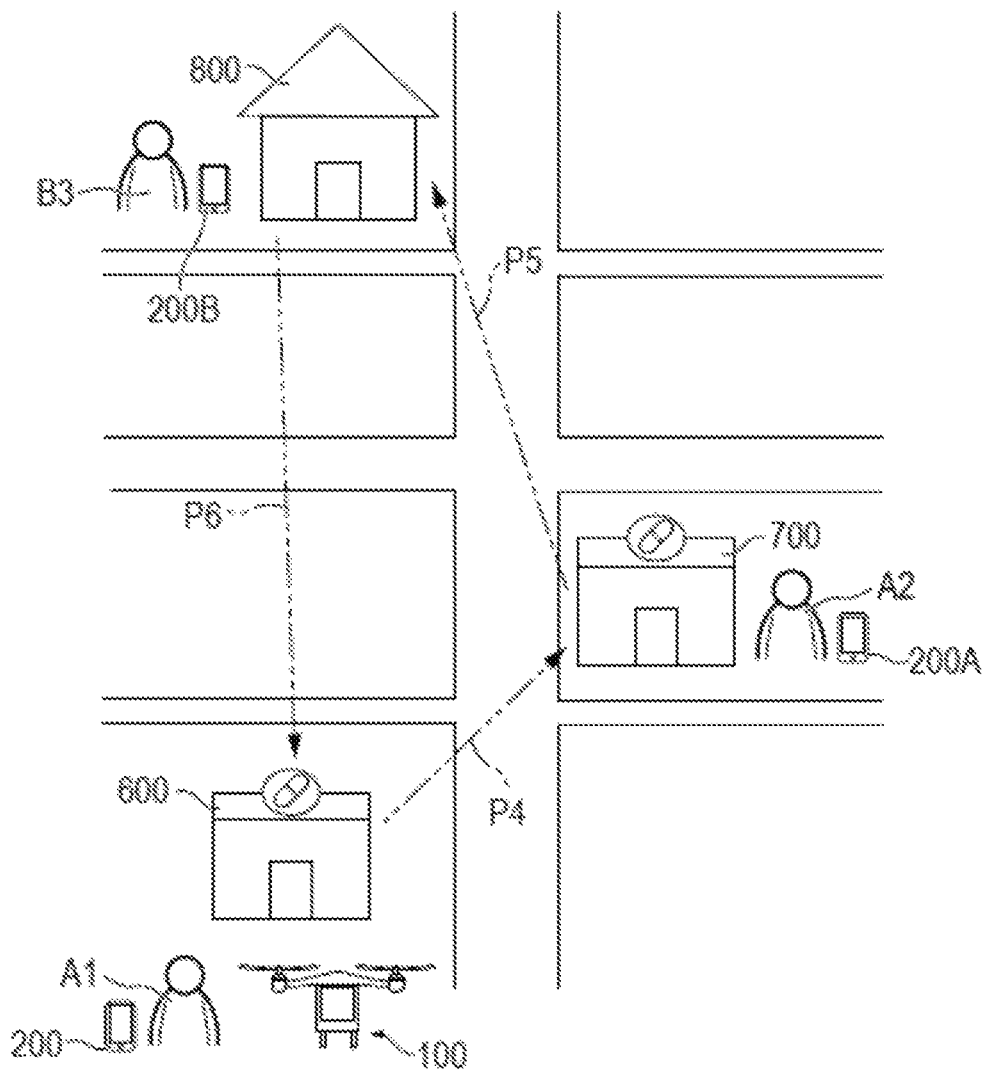
FIG. 9 is a diagram for showing a movement path and medical support work of an unmanned aerial vehicle according to modification example 1 in accordance with at least some embodiments of the present disclosure.

In the example that is illustrated in FIG. 9, the unmanned aerial vehicle 100 performs the "dispensing confirmation" for medicine dispensed by a pharmacist A1 at the pharmacy 600 between a pharmacist A2 staying at the other pharmacy 700 and itself and transports the medicine from the pharmacy 700 to the home care patient B3. Then, the unmanned aerial vehicle 100 performs the "medicine management guidance" with respect to the home care patient B3.

By various types of medical support work being executed with the unmanned aerial vehicle 100 used outside a hospital as in this example, labor shortage that could arise at pharmacies in remote areas and the like can be made up for. In addition, medicine management work can be performed with respect to the home care patient B3 even in a case where the home care patient B3 stays in a remote area, and thus medical services of even higher quality can be provided. In a case where the pharmacist A1 and the pharmacist A2 are family pharmacists for the home care patient B3, in particular, uniform and continuous medication guidance and the like can be performed with respect to the home care patient B3 by the use of the unmanned aerial vehicle 100, and thus merits of the use of the unmanned aerial vehicle 100 increase to a significant extent.

After finishing the medical support work (medicine transport and medicine management guidance) with respect to the home care patient B3, the unmanned aerial vehicle 100 returns to the pharmacy 600 where the pharmacist A1 stays and feeds back a result of the work executed with respect to the home care patient B3.

For example, the unmanned aerial vehicle 100 may receive medical support work selection and interruption via an information terminal device 200A carried around by the pharmacist A2 and an information terminal device 200B carried around by the home care patient B3.

A movement path P4 directed from the pharmacy 600 to the pharmacy 700 can be stored in the RAM (storage unit) of the control unit 130 as the "movement path for moving between different pharmacies". A movement path P5 directed from the pharmacy 700 to the residence 800 of the home care patient B3 and a movement path P6 directed from the residence 800 of the home care patient B3 to the pharmacy 600 can be stored in the RAM (storage unit) of the control unit 130 as "movement paths for moving between pharmacy and home care patient's place of stay".

Modification Example 2

Figure 10:
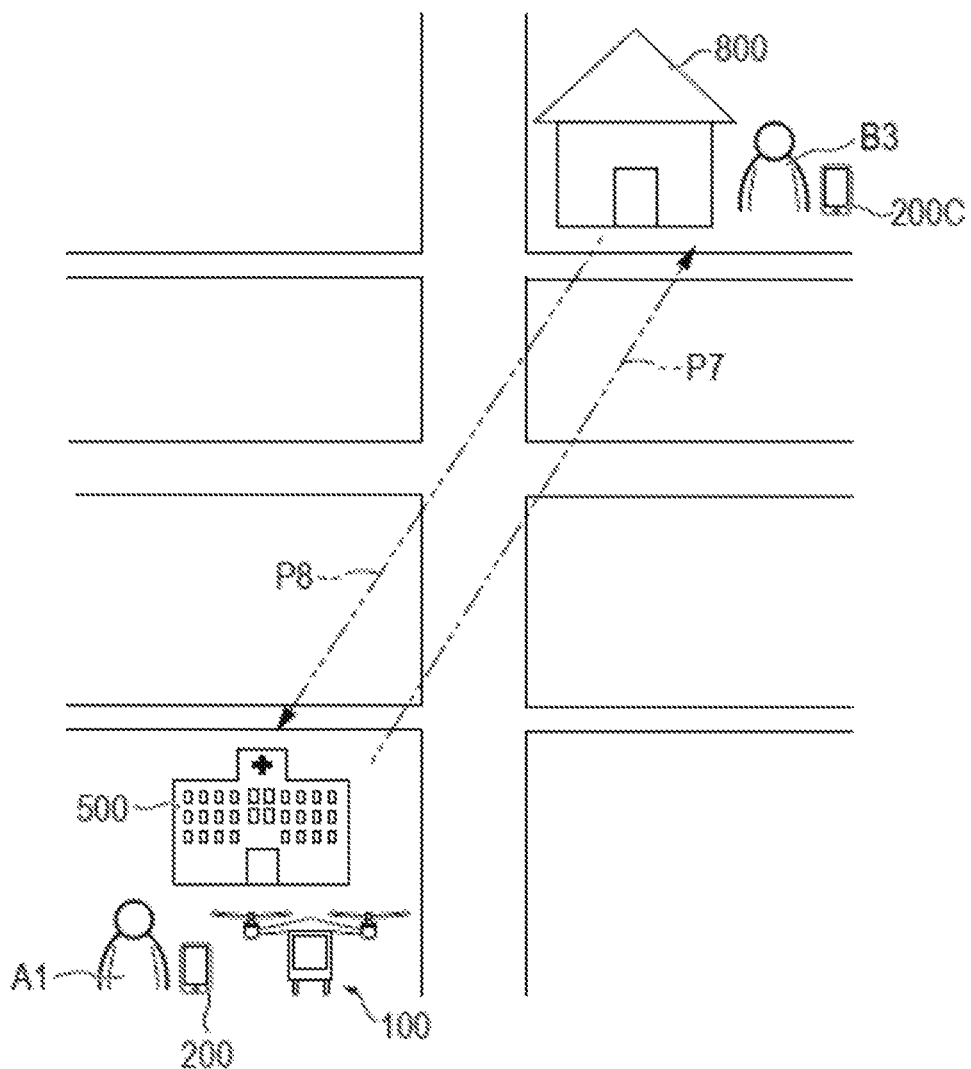
FIG. 10 is a diagram for showing a movement path and medical support work of an unmanned aerial vehicle according to modification example 2 in accordance with at least some embodiments of the present disclosure.

FIG. 10 shows an example of the use of the unmanned aerial vehicle 100 in work for a doctor A1 staying in the hospital 500 to examine the home care patient B3.

By the examination of the home care patient B3 being performed based on the use of the unmanned aerial vehicle 100, the doctor A1 does not have to visit the residence 800 of the home care patient B3 himself or herself, and thus the doctor A1 can spend less time on movement. In provincial cities or the like where the number of health care workers including doctors is insufficient, doctors do not have time to visit home care patients themselves and sufficient medical services cannot be provided for the home care patients in many cases. When the unmanned aerial vehicle 100 is used for the examination of the home care patient B3 as in the present modification example, thus the quality of regional medical care in provincial cities where aging is in progress can be improved.

In a case where the home care patient B3 is an elderly peritoneal dialysis patient, in particular, the elderly patient has a hard time carrying and discarding a dialysate bag in which a peritoneal dialysate is put because the bag is heavy and bulky. The unmanned aerial vehicle 100, however, includes the "article (including medicine) transport" with respect to the home care patient B3, and thus is highly useful for dialysate bag and disposal bag transports.

In a case where "examination" is executed based on the use of the unmanned aerial vehicle 100, the unmanned aerial vehicle 100 is operated for communication with the home care patient B3 by performing real-time image and voice output through the transmitting and receiving unit 290 of the information terminal device 200.

After finishing the examination with respect to the home care patient B3, the unmanned aerial vehicle 100 returns to the hospital 500 where the doctor A1 stays.

The unmanned aerial vehicle 100 may also receive the medical support work execution and interruption via, for example, the information terminal device 200B carried around by the home care patient B3.

A movement path P7 directed from the hospital 500 to the residence 800 of the home care patient B3 and a movement path P8 directed from the residence 800 of the home care patient B3 to the hospital 500 can be stored in the RAM (storage unit) of the control unit 130 as "movement paths for moving between hospital and home care patient's place of stay".

Examples of the unmanned aerial vehicle and the medical support method have been described and the plurality of modification examples aforementioned. The embodiments are not limited to what has been described and can be appropriately changed based on what is described in the scope of claims.

The medical support work that is executed by the unmanned aerial vehicle is not particularly limited insofar as it can be executed by the unmanned aerial vehicle. For example, it may be work performed in hospitals, combinations of work performed in and out of hospitals, work performed in non-hospital facilities, and complex combinations of those types of work, too.

A plurality of the unmanned aerial vehicles can be used in a single facility as well. Even in this case where the plurality of unmanned aerial vehicles is used, hindrance to pedestrians and the like can be prevented by the unmanned aerial vehicles being afloat and standing by in the air. In facilities such as hospitals, for example, the plurality of unmanned aerial vehicles may be allowed to stay near the ceiling of a corridor (passage) or may be allowed to stand by together in a dedicated standby room. In the case where the plurality of unmanned aerial vehicles is used, each of the unmanned aerial vehicles may be prepared as a dedicated machine executing one type of work or a plurality of types of the medical support work may be simultaneously executed with respect to one object person by the plurality of unmanned aerial vehicles.

Transmission of a transmission signal to the unmanned aerial vehicle may not be performed based on the use of the information terminal device. For example, an instruction may be directly carried out via the input IF (such as an operation switch and a touch screen) that is disposed in the unmanned aerial vehicle or the transmission command may be transmitted by the use of a dedicated controller. A data transmitting and receiving unit (slot) or the like that allows data transmission and reception to and from a storage medium such as a nonvolatile memory card can also be disposed in the unmanned aerial vehicle. In addition, various types of the medical support work may be executed by the unmanned aerial vehicle being used alone without a network including the management server and the like being established.

REFERENCE SIGNS LIST

1 Medical support system
10 Unmanned aerial vehicle
110 Main body portion
111 Display unit
113 Speaker
117 Load receiving unit
120 Upper housing
121a, 121b, 121c, 121d Rotary blade
130 Control unit
190 Transmitting and receiving unit (receiving unit)
200, 200A, 200B Information terminal device
230 Control unit
231 Application execution unit
240 Output IF
280 Input IF
290 Transmitting and receiving unit
300 management server
410 Article
420 Intravenous drip bag
500 Hospital
600, 700 Pharmacy
800 Home care patient's place of stay
R1 Standby room
A1 Health care worker

What is claimed is:

1. An unmanned aerial vehicle capable of performing autonomous flight, the unmanned aerial vehicle comprising:
   a wireless communication receiving unit;
   a processor coupled to the wireless communication receiving unit; and
   a memory coupled with and readable by the processor and storing therein instructions that, when executed by the processor, cause the processor to:
      receive, via the wireless communication receiving unit across a wireless communication network, a command input from a health care working including details of medical support work to be performed by the unmanned aerial vehicle, and
      control an operation of the unmanned aerial vehicle based on the details of the command input received, comprising:
         causing the unmanned aerial vehicle to hover above a patient and move the unmanned aerial vehicle in coordination with a movement of the patient while the patient is moving under the unmanned aerial vehicle; and
         carrying a load above the patient while the patient is moving under the unmanned aerial vehicle.

2. The unmanned aerial vehicle according to claim 1, further comprising:
   a member connected to a portion of the unmanned aerial vehicle, the member having a shape of a hanging ring, and
   wherein the member supports an intravenous drip bag for the patient receiving an intravenous drip from the intravenous drip bag.

3. The unmanned aerial vehicle according to claim 1, further comprising:
   a member connected to a portion of the unmanned aerial vehicle, the member including a handrail for the patient, and
   wherein the handrail supports the patient in moving from one position to another position while the patient is gripping the handrail.

4. The unmanned aerial vehicle according to claim 1, wherein the instructions further cause the processor to:
   receive, via the wireless communication receiving unit across the wireless communication network, an information transmission from the health care worker transmitted to the patient, and wherein content from the information transmission is at least one of rendered by a display device of the unmanned aerial vehicle and output by a speaker of the unmanned aerial vehicle.

5. The unmanned aerial vehicle according to claim 1, wherein the memory stores movement paths directed toward a medical site where at least some of the medical support work is performed, and
   wherein the movement paths include a movement path for moving between different places in a hospital.

6. The unmanned aerial vehicle according to claim 1, wherein the instructions further cause the processor to:
   receive, via the wireless communication receiving unit, a transmission command transmitted from a portable communication device operated by health care worker; and
   control the operation of the unmanned aerial vehicle in accordance with processing content included in the transmission command.

7. A medical support method for performing medical support work by using an unmanned aerial vehicle capable of performing autonomous flight, the medical support method comprising:
   receiving, across a wireless communication network, a command input from a health care worker via a wireless communication receiving unit of the unmanned aerial vehicle, the command input including details of the medical support work to be performed by the unmanned aerial vehicle; and
   controlling, via a processor of the unmanned aerial vehicle, an operation of the unmanned aerial vehicle based on the details of the command input received, wherein controlling the operation of the unmanned aerial vehicle comprises hovering above a patient and moving the unmanned aerial vehicle in coordination with a movement of the patient while the patient is moving under the unmanned aerial vehicle, and wherein performing the medical support work comprises carrying a load above the patient while the patient is moving under the unmanned aerial vehicle.

8. The unmanned aerial vehicle according to claim 4, wherein the information transmission between the health care worker and the patient includes a real-time patient examination performed by a doctor, and wherein the real-time patient examination includes communicating image and voice output in real-time over the wireless communication network and through the display device and speaker of the unmanned aerial vehicle.

9. The unmanned aerial vehicle according to claim 1, wherein the memory stores movement paths directed toward a medical site where at least some of the medical support work is performed, and
   wherein the movement paths include at least one of a movement path for moving between different pharmacies, and a movement path for moving between a hospital or a pharmacy and a home care patient's place of stay.

10. The medical support method according to claim 7, wherein a member connected to a portion of the unmanned aerial vehicle having a shape of a hanging ring supports an intravenous drip bag for the patient receiving an intravenous drip from the intravenous drip bag.

11. The medical support method according to claim 7, wherein a member connected to a portion of the unmanned aerial vehicle including a handrail for the patient supports the patient in moving from one position to another position while the patient is gripping the handrail.

12. The medical support method according to claim 7, wherein performing the medical support work includes transmitting, across the wireless communication network, an information transmission from the health care worker to the patient, and wherein content from the information transmission is at least one of rendered by a display device of the unmanned aerial vehicle and output by a speaker of the unmanned aerial vehicle.

13. The medical support method according to claim 7, wherein the memory of the controller stores movement paths directed toward a medical site where at least some of the medical support work is performed, and wherein the movement paths include at least one of a movement path for moving between different places in a hospital, a movement path for moving between different pharmacies, and a movement path for moving between a hospital or a pharmacy and a home care patient's place of stay.

14. The medical support method according to claim 7, wherein the wireless communication receiving unit is configured to receive a transmission command transmitted from a portable communication device operated by the health care worker, and wherein the controller performs the medical support work in accordance with processing content included in the transmission command.

15. A medical support method for controlling an unmanned aerial vehicle capable of performing autonomous flight, the medical support method comprising:
sending, via a portable communication device in wireless communication with a wireless communication receiving unit of the unmanned aerial vehicle, details of medical support work to be performed by the unmanned aerial vehicle, wherein the details are sent in response to receiving a command input provided by the health care worker at a touch-based interface of the portable communication device; and
controlling an operation of the unmanned aerial vehicle based on the details of the command input, comprising at least one of:
causing the unmanned aerial vehicle to hover above a patient and move in coordination with a movement of the patient while the patient is moving under the unmanned aerial vehicle;
causing the unmanned aerial vehicle to carry a load above the patient while the patient is moving under the unmanned aerial vehicle; and
causing the unmanned aerial vehicle to transmit information about a medicine dispensed by a pharmacist at a location of the unmanned aerial vehicle and receive a confirmation from the health care worker that the medicine dispensed by the pharmacist is free of errors.

16. The medical support method according to claim 15, wherein controlling the operation of the unmanned aerial vehicle further comprises:
causing the unmanned aerial vehicle to move along at least one of a movement path between different pharmacies, and a movement path between a hospital or a pharmacy.

17. The medical support method according to claim 15, wherein controlling the operation of the unmanned aerial vehicle further comprises:
causing the unmanned aerial vehicle to move along a plurality of movement paths, wherein at least one of the plurality of movement paths includes a facility to be avoided, and wherein, upon approaching the facility to be avoided, the unmanned aerial vehicle is caused to select a bypass route avoiding the facility to be avoided.

18. The medical support method according to claim 15, wherein controlling the operation of the unmanned aerial vehicle further comprises:
causing the unmanned aerial vehicle to assist the patient in moving from one position to another position while the patient is gripping a handrail of the unmanned aerial vehicle.

19. The medical support method according to claim 15, wherein the load is an intravenous bag attached to the unmanned aerial vehicle, and wherein the patient, while moving under the unmanned aerial vehicle, receives an intravenous drip from the intravenous bag carried by the unmanned aerial vehicle.

20. The medical support method according to claim 19, wherein controlling the operation of the unmanned aerial vehicle further comprises:
causing the unmanned aerial vehicle to follow the patient up a stairway while carrying the intravenous bag.

* * * * *